United States Patent
Kim et al.

(10) Patent No.: US 12,463,303 B2
(45) Date of Patent: Nov. 4, 2025

(54) LAMINATION DEVICE AND METHOD AND SECONDARY BATTERY MANUFACTURING EQUIPMENT COMPRISING LAMINATION DEVICE

(71) Applicant: LG ENERGY SOLUTION, LTD., Seoul (KR)

(72) Inventors: Min Wook Kim, Daejeon (KR); Won Nyeon Kim, Daejeon (KR); Jung Kwan Pyo, Daejeon (KR); Cha Hun Ku, Daejeon (KR); Byeong Kyu Lee, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 393 days.

(21) Appl. No.: 17/294,578

(22) PCT Filed: Nov. 26, 2019

(86) PCT No.: PCT/KR2019/016393
§ 371 (c)(1),
(2) Date: May 17, 2021

(87) PCT Pub. No.: WO2020/116846
PCT Pub. Date: Jun. 11, 2020

(65) Prior Publication Data
US 2022/0006161 A1 Jan. 6, 2022

(30) Foreign Application Priority Data
Dec. 4, 2018 (KR) ........................ 10-2018-0154583

(51) Int. Cl.
*H01M 50/566* (2021.01)
*B32B 37/00* (2006.01)
(Continued)

(52) U.S. Cl.
CPC ....... *H01M 50/566* (2021.01); *B32B 37/0053* (2013.01); *H01M 10/0404* (2013.01); *H01M 50/46* (2021.01); *H01M 10/615* (2015.04)

(58) Field of Classification Search
CPC ............... H01M 50/566; H01M 50/46; H01M 10/0404; H01M 10/04; H01M 10/612;
(Continued)

(56) References Cited

U.S. PATENT DOCUMENTS 9,466,825 B2   10/2016   Miyazaki et al.
2003/0202826 A1*  10/2003  Yokoi ................ G03G 15/2057
                                                                 399/328
(Continued)

FOREIGN PATENT DOCUMENTS

CN   106222068 A   12/2016
CN   108199092 A    6/2018
(Continued)

OTHER PUBLICATIONS

English Translation of JP 2013116624 A—Thermal Laminator; Tiko Corp LTD; Jun. 13, 2013 (Year: 2013).*
(Continued)

*Primary Examiner* — Adam J Francis
(74) *Attorney, Agent, or Firm* — Birch, Stewart, Kolasch & Birch, LLP (57) ABSTRACT

Discussed is a lamination device for bonding an electrode and a separator of an electrode assembly to each other. The lamination device includes: a transfer part configured to transfer the electrode assembly; a heating roller part configured to heat the electrode assembly transferred by the transfer part; and a rolling roller configured to roll the electrode assembly heated by the heating roller part so that the electrode and the separator are bonded to each other, wherein the heating roller part comprises a plurality of
(Continued)

heating rollers configured to press and heat a surface of the electrode assembly at the same time, and the plurality of heating rollers sequentially press the surface of the electrode assembly and simultaneously heat the surface of the electrode assembly so that the electrode assembly gradually increases in temperature.

12 Claims, 10 Drawing Sheets

(51) Int. Cl.
*H01M 10/04* (2006.01)
*H01M 10/615* (2014.01)
*H01M 50/46* (2021.01)

(58) Field of Classification Search
CPC .......... H01M 10/0481; H01M 10/486; H01M 10/48; B32B 37/0053; B32B 37/00
See application file for complete search history.

(56) References Cited

U.S. PATENT DOCUMENTS

| 2004/0040669 | A1* | 3/2004 | Lin | ............... B32B 37/0053 |
| | | | | 156/583.1 |
| 2010/0167176 | A1* | 7/2010 | Kawai | ............ H01M 4/8896 |
| | | | | 156/60 |
| 2013/0260211 | A1 | 10/2013 | Min et al. | |
| 2013/0276975 | A1* | 10/2013 | Nagasaka | ........ B32B 37/1027 |
| | | | | 156/538 |
| 2014/0099538 | A1* | 4/2014 | Johnson | ............ H01M 4/13 |
| | | | | 429/231.95 |
| 2015/0129107 | A1* | 5/2015 | Miyazaki | ............ B32B 38/1841 |
| | | | | 156/522 |
| 2019/0389193 | A1* | 12/2019 | Nathanson | ........ B32B 37/0053 |

FOREIGN PATENT DOCUMENTS

| EP | 3147977 A1 | 3/2017 | | |
| JP | 11-176473 A | 7/1999 | | |
| JP | 2012-121155 A | 6/2012 | | |
| JP | 2013-122831 A | 6/2013 | | |
| JP | 2013116624 A | * 6/2013 | ............ B32B 37/06 |
| JP | 2014-60167 A | 4/2014 | | |
| JP | 2014139896 A | * 7/2014 | | |
| KR | 10-2006-0002568 A | 1/2006 | | |
| KR | 10-2010-0132249 A | 12/2010 | | |
| KR | 10-2012-0060700 A | 6/2012 | | |
| KR | 10-2017-0036398 A | 4/2017 | | |
| KR | 10-2017-0037813 A | 4/2017 | | |
| KR | 10-1725904 B1 | 4/2017 | | |
| KR | 20170036398 A | * 4/2017 | | |
| KR | 20170037813 A | * 4/2017 | | |
| KR | 10-2018-0023185 A | 3/2018 | | |
| KR | 20180023185 A | * 3/2018 | | |

OTHER PUBLICATIONS

International Search Report for PCT/KR2019/016393 mailed on Mar. 11, 2020.
Extended European Search Report for European Application No. 19894268.2, dated Dec. 23, 2021.

* cited by examiner

|  | Comparative Example | Manufacturing Example 1 |
|---|---|---|
| time taken to reach 60°C | 4.25s | 0.44s |

LAMINATION DEVICE AND METHOD AND SECONDARY BATTERY MANUFACTURING EQUIPMENT COMPRISING LAMINATION DEVICE

CROSS-REFERENCE TO RELATED APPLICATION

The present application claims the benefit of the priority of Korean Patent Application No. 10-2018-0154583, filed on Dec. 4, 2018, which is hereby incorporated by reference in its entirety.

TECHNICAL FIELD

The present invention relates to a lamination device and method and secondary battery manufacturing equipment comprising the lamination device, and more particularly, to a lamination device and method, which directly heat an electrode assembly, in which electrodes and separators are alternately laminated, to improve heat transfer efficiency, and secondary battery manufacturing equipment comprising the lamination device.

BACKGROUND ART

In general, secondary batteries refer to chargeable and dischargeable batteries, unlike primary batteries that are not chargeable. The secondary batteries are being widely used in the high-tech electronic fields such as mobile phones, notebook computers, and camcorders.

Such a secondary battery comprises an electrode assembly, in which an electrode and a separator are alternately laminated, and a case accommodating the electrode assembly. A method for manufacturing the secondary battery comprises a process of manufacturing electrodes, a process of alternately laminating the manufactured electrodes and separators to manufacture an electrode assembly, a lamination process of thermally bonding the electrode assembly, a process of accommodating the electrode assembly into a case to manufacture an unfinished secondary battery, and an activation process of charging and discharging the unfinished secondary battery.

In the lamination process, a heating device having a heating section in which the electrode assembly is heated and a rolling device that rolls the heated electrode assembly are used.

However, in the lamination process, since the heating device transfers radiant heat, it takes a long time to heat the electrode assembly. Particularly, since the heating section of the heating device has to be largely secured, there is a problem that efficiency is significantly reduced.

DISCLOSURE OF THE INVENTION

Technical Problem

The present invention has been invented to solve the above problems, and the present invention comprises a heating device provided with a heating roller that directly heats an electrode assembly. The heating roller is provided in plurality to improve heat transfer efficiency, and significantly reduce an installation section of the heating device. Particularly, an object of the present invention is to provide a lamination device and method, in which a temperature of the electrode assembly gradually increases through the plurality of heating rollers, and thus, the temperature of the electrode assembly increases without deforming and damaging an electrode or a separator, which are provided in the electrode assembly, and secondary battery manufacturing equipment comprising the lamination device.

Technical Solution

A lamination device of the present invention for achieving the above objects is configured to bond an electrode and a separator of an electrode assembly to each other and comprise: a transfer part configured to transfer the electrode assembly; a heating roller part configured to heat the electrode assembly transferred by the transfer part; and a rolling roller configured to roll the electrode assembly heated by the heating roller part so that the electrode and the separator are bonded to each other, wherein the heating roller part comprises a plurality of heating rollers configured to press and heat a surface of the electrode assembly at the same time, and the plurality of rollers sequentially press the surface of the electrode assembly and simultaneously heat the surface of the electrode assembly so that the electrode assembly gradually increases in temperature.

The plurality of heating rollers may have the same size or different sizes.

When the plurality of heating rollers have the different sizes, the heating rollers may have sizes that gradually increase from the heating roller that initially heats the electrode assembly to the heating roller that finally heats the electrode assembly.

The plurality of heating rollers may have the same heating temperature or different heating temperatures.

When the plurality of heating rollers have the different heating temperatures, the heating temperature may gradually increase from the heating roller that initially heats the electrode assembly to the heating roller that finally heats the electrode assembly.

The heating roller part may comprise a heating body having an accommodation space through which the electrode assembly passes, and the plurality of heating rollers may be provided in the accommodation space of the heating body to press the electrode assembly passing through the accommodation space and simultaneously heat the electrode assembly.

The heating roller part may further comprise: a temperature sensor configured to measure a temperature of the electrode assembly passing through the plurality of heating rollers; and a controller configured to generate a normal signal when the measured temperature value is within a set error range in comparison to a previously input set temperature value and output an abnormal signal when the measured temperature value is out of the set error range.

The heating roller part may further comprise an adjustment member configured to heat or cool the electrode assembly passing through the plurality of heating rollers so as to adjust the temperature of the electrode assembly so that the temperature of the electrode assembly is within the error range of the previously input set temperature value when the abnormal signal is output by the controller.

When the abnormal signal is output, the controller may accelerate or decelerate a transfer speed of the electrode assembly through the transfer part to adjust a contact time between the electrode assembly and the heating roller part, thereby adjusting a heating temperature of the electrode assembly.

A blocking plate configured to prevent heat from being transferred may be provided between the plurality of heating rollers.

A lamination method comprises: a transfer step (S10) of transferring an electrode assembly in which an electrode and a separator are laminated; a heating step (S20) of pressing and heating the electrode assembly transferred in the transfer step (S10) at the same time; and a bonding step (S30) of rolling the electrode assembly heated in the heating step (S20) to bond the electrode and the separator to each other, wherein, the heating step (S20) comprises a heating process (S21) in which a surface of the electrode assembly is sequentially pressed and simultaneously heated through a plurality of heating rollers so that the electrode assembly 10 gradually increases in temperature.

The heating step (S20) may further comprise: a measuring process (S22) of measuring the temperature of the electrode assembly heated in the heating process (S21); and an inspection process (S23) of generating a normal signal if a measured temperature value is within an error range and outputting an abnormal signal if the measured temperature value is out of the error range when the measured temperature value of the electrode assembly, which is measured in the measuring process (S22), is compared with an input set temperature value.

The heating step (S20) may further comprise an inspection process (S23) of heating or cooling the electrode assembly passing through the plurality of heating rollers to adjust the temperature of the electrode assembly to be within the error range of the set temperature value when the abnormal signal is output in the inspection process (S23).

In the heating step (S20), a transfer speed of the electrode assembly transferred in the transfer step (S10) may be adjusted together with the adjusting process (S24) so that a heating temperature of the electrode assembly is within the error range of the set temperature value.

The heating step (S20) may further comprises an adjustment process (S24) of heating or cooling the electrode assembly passing through the plurality of heating rollers to adjust the temperature of the electrode assembly to be within the error range of the set temperature value when the abnormal signal is output in the inspection process (S23).

In the heating step (S20), a transfer speed of the electrode assembly transferred in the transfer step (S10) may be adjusted together with the adjusting process (S24) so that a contact time between the electrode assembly and each of the heating rollers increases or decreases to allow a heating temperature of the electrode assembly to be within the error range of the set temperature value.

Secondary battery manufacturing equipment comprises: an electrode assembly manufacturing device for manufacturing an electrode assembly by alternately laminating an electrode and a separator; and a lamination device for bonding the electrode and the separator of the electrode assembly to each other, wherein the lamination device comprises: a transfer part configured to transfer the electrode assembly; a heating roller part configured to heat the electrode assembly transferred by the transfer part; and a rolling roller configured to roll the electrode assembly heated by the heating roller part so that the electrode and the separator are bonded to each other, wherein the heating roller part comprises a plurality of heating rollers configured to press and heat a surface of the electrode assembly at the same time, and the plurality of rollers sequentially press the surface of the electrode assembly and simultaneously heat the surface of the electrode assembly so that the electrode assembly gradually increases in temperature.

Advantageous Effects

The lamination device of the present invention may comprises the heating member comprising the plurality of heating rollers that heat the surface of the electrode assembly while pressing the surface of the electrode assembly. Therefore, the surface of the electrode assembly may be sequentially pressed and heated to gradually increase in temperature, thereby improving the heat transfer efficiency. Particularly, the heating section of the electrode assembly may be minimized, and the electrode and the separator, which are provided in the electrode assembly, may be prevented from being deformed and damaged to manufacture the electrode assembly having the high quality.

Particularly, the lamination device may comprise the plurality of heating rollers to prevent the electrode assembly from being twisted during the transfer of the electrode assembly, thereby preventing the defective electrode assembly from being manufactured.

MODE FOR CARRYING OUT THE INVENTION

Hereinafter, embodiments of the present invention will be described in detail with reference to the accompanying drawings in such a manner that the technical idea of the present invention may easily be carried out by a person with ordinary skill in the art to which the invention pertains. The present invention may, however, be embodied in different forms and should not be construed as limited to the embodiments set forth herein. In the drawings, anything unnecessary for describing the present invention will be omitted for clarity, and also like reference numerals in the drawings denote like elements.

[Electrode Assembly]

An electrode assembly 10 comprises electrodes and separators. That is, referring to FIG. 1, the electrode assembly 10 has a structure in which a plurality of electrodes 11 and a plurality of separators 12, each of which has a long sheet shape, are alternately laminated.

Figure 1:
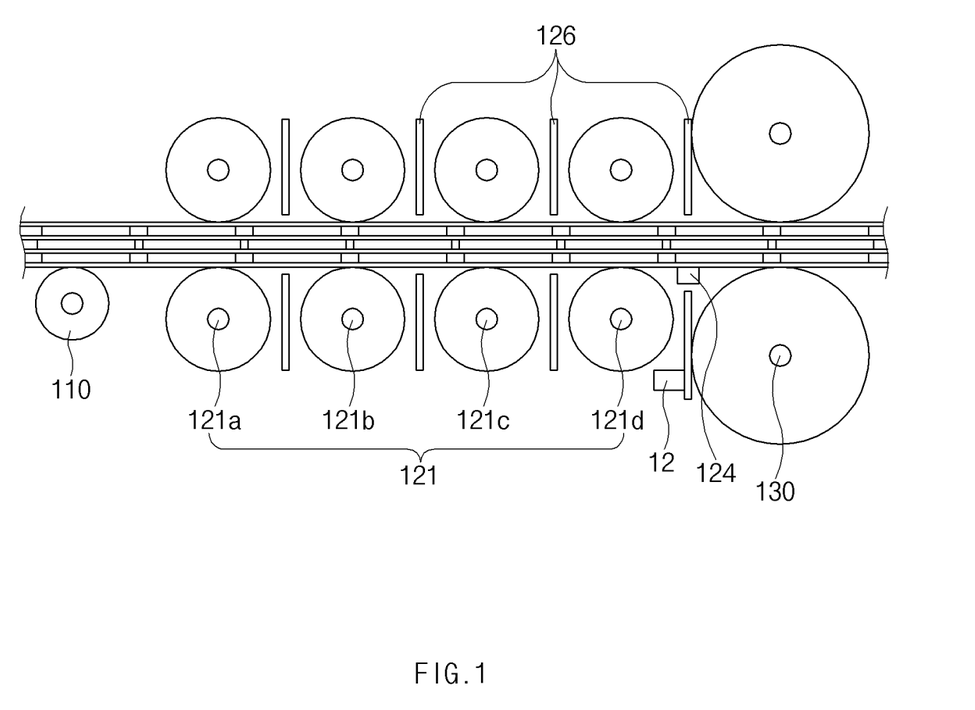
FIG. 1 is a side view of a lamination device according to a first embodiment of the present invention.

The plurality of electrodes 11 may comprise a positive electrode and a negative electrode, and the electrode assembly 10 may have a structure in which a positive electrode, a separator, a negative electrode, a separator, and a positive electrode are sequentially laminated.

The electrode assembly 10 having the above-described structure increase in bonding force through the lamination device 100 according to the first embodiment of the present invention.

Here, the lamination device 100 according to the first embodiment of the present invention may directly press and simultaneously heat the electrode assembly 10 to sequentially press the surface of the electrode assembly and simultaneously heat the surface of the electrode assembly 10 so that the electrode assembly 10 gradually increases in temperature. Therefore, the heat transfer efficiency of the electrode assembly 10 may be improved, and particularly, the electrode 11 and the separator 12, which are provided in the electrode assembly 10, may be quickly heated without being deformed and damaged.

Referring to FIG. 1, the lamination device 100 according to the first embodiment of the present invention may further comprise the protective film 20 for protecting the surface of the electrode assembly 10 because the electrode assembly 10 is directly pressed and simultaneously heated. The protective film 20 may be attached to the electrode assembly 10 and then be removed from the electrode assembly 10 when the rolling of the electrode assembly 10 is completed.

Hereinafter, the lamination device according to the first embodiment of the present invention will be described in more detail.

[Lamination Device According to First Embodiment of the Present Invention]

Figure 2:
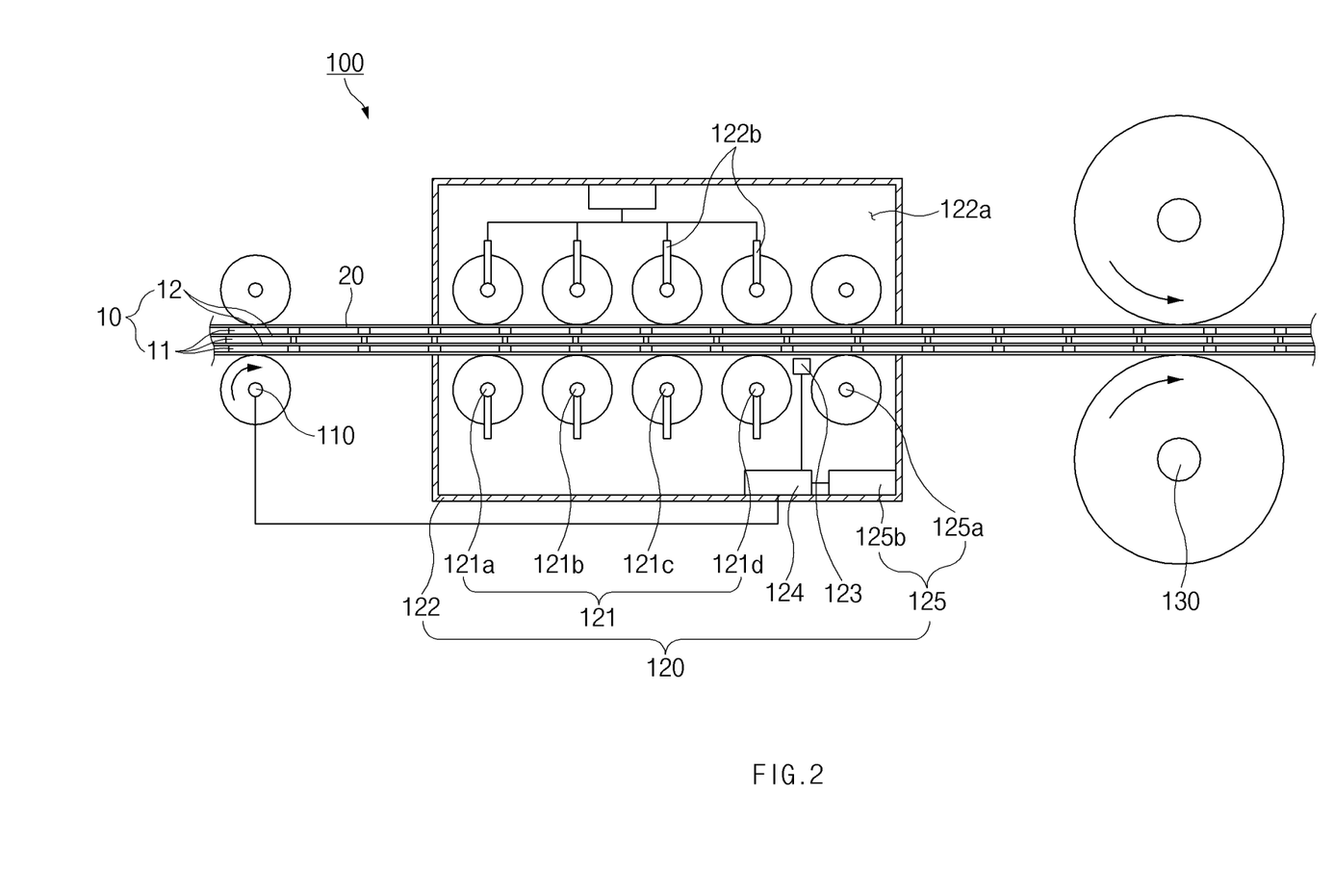
FIG. 2 is a side view of a heating roller part that further comprises a heating body, a temperature sensor, a controller, and an adjustment member in the lamination device according to the first embodiment.

As illustrated in FIG. 1 and FIG. 2, the lamination device 100 according to the first embodiment of the present invention comprises a transfer part 110 for transferring the electrode assembly 10, a heating roller part 120 for heating the electrode assembly 10 transferred by the transfer part 110, and a rolling roller 130 for rolling the electrode assembly 10 heated by the heating roller part 120 so that the electrode and the separator are bonded to each other.

Transfer Part

The transfer part 110 comprises a transfer roller, and the transfer roller transfers the electrode assembly in a direction of the rolling roller 130 through rotation force thereof.

Heating Roller Part

The heating roller part 120 is configured to directly press and simultaneously heat the electrode assembly transferred by the transfer part. That is, the heating roller part 120 directly conducts heat from a heating source to the electrode assembly in a state in which the electrode assembly 10 is pressed.

That is, the heating roller part 120 comprises a plurality of heating rollers 121 that press both or opposite surfaces of the electrode assembly 10 transferred to the transfer part 110 and simultaneously heat both the surfaces of the electrode assembly 10. The plurality of heating rollers 121 sequentially press the surface of the electrode assembly 10 and simultaneously heat the surface of the electrode assembly 10 so that the electrode assembly 10 gradually increases in temperature.

That is to say, the heating roller part 120 sequentially presses the same surface of the electrode assembly 10 by using the plurality of heating rollers 121 and simultaneously heats the surface of the electrode assembly 10 so that the surface temperature of the electrode assembly 10 gradually increases, thereby quickly heating the electrode assembly 10.

For example, referring to FIG. 1 and FIG. 2, the heating roller part 120 comprises four heating rollers that press the electrode 10 and simultaneously heat the electrode assembly 10. The four heating rollers comprise a first heating roller 121a for initially heating the electrode assembly 10, a second heating roller 121b for heating the electrode assembly 10 after heating the electrode assembly 10 through the first heating roller 121a, a third heating roller 121c for heating the electrode assembly 10 after heating the electrode assembly 10 through the second heating roller 121b, and a fourth heating roller 121d for finally heating the electrode assembly 10.

Figure 9:
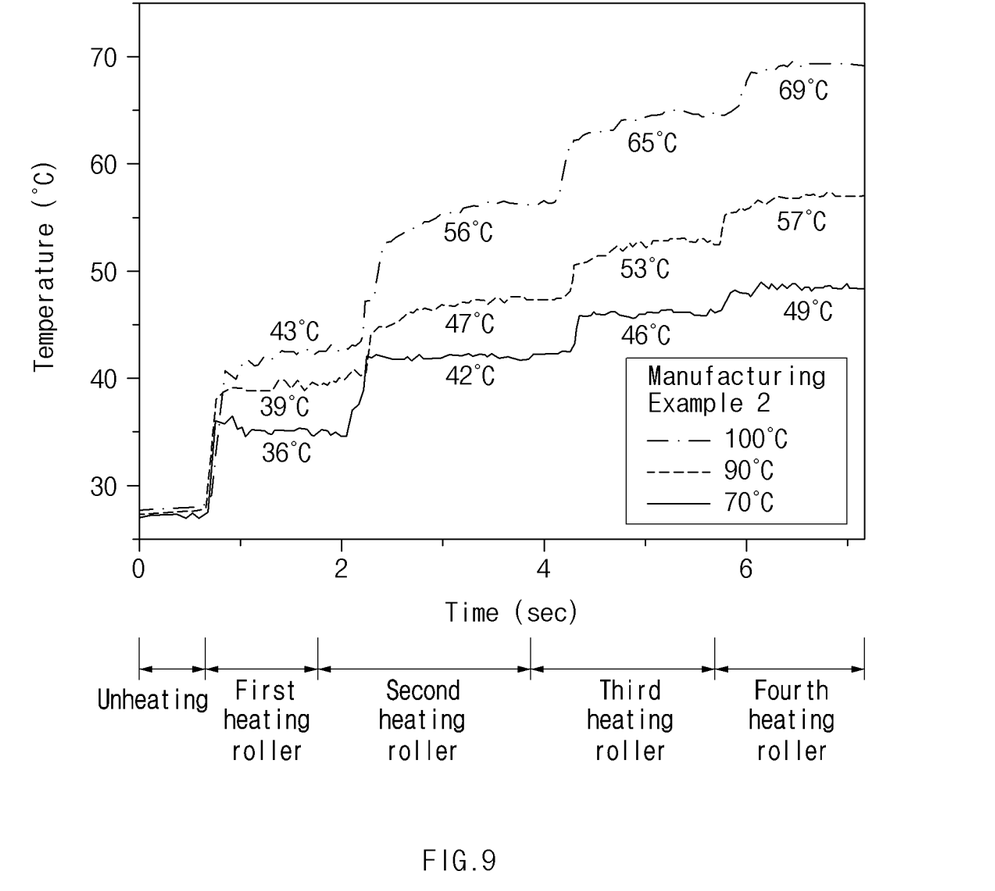
FIG. 9 is a graph illustrating Experimental Example 2 according to the present invention.

In the heating roller part 120 having the above-described configuration, when the surface of the electrode assembly 10 is heated by the first heating roller 121a, the electrode assembly 10 is heated at a first temperature, and then, when the surface of the electrode assembly 10, which has the first temperature, is heated by the second heating roller 121b, the electrode assembly 10 is heated at a second temperature higher than the first temperature. Then, when the surface of the electrode assembly 10, which has the second temperature, is heated by the third heating roller 121c, the electrode assembly 10 is heated at a third temperature higher than the second temperature, and then, when the surface of the electrode assembly 10, which has the third temperature, is heated by the fourth heating roller 121d, the electrode assembly 10 is heated at a fourth temperature higher than the third temperature. That is, as illustrated in FIG. 9, the temperature of the electrode assembly 10 gradually increases from the first temperature to the fourth temperature.

Thus, the heating roller part 120 may comprise the first to fourth heating rollers. As a result, the surface of the electrode assembly 10 may be sequentially pressed and simultaneously heated so that the electrode assembly 10 gradually increases in temperature.

Although the four heating rollers are provided in this embodiment of the present invention, the embodiment of the present invention is not limited thereto. For example, three or less heating rollers or four or more heating rollers may be provided to heat the electrode assembly 10.

The plurality of heating rollers 121 of the heating roller part 120 may have the same size. Particularly, the plurality of heating rollers may have the same size, width, weight to uniformly press the entire surface of the electrode assembly 10, thereby uniformly heating the entire surface of the electrode assembly 10 without a temperature deviation.

The plurality of heating rollers 121 of the heating roller part 120 may have the same heating temperature. Particularly, the plurality of heating rollers 121 may have the same heating temperature and the same rotation rate to uniformly heat the entire surface of the electrode assembly 10 for the same time, thereby uniformly heating the entire surface of the electrode assembly 10 without the temperature deviation.

As illustrated in FIG. 2, the heating roller part 120 comprises a heating body 122 through which the electrode assembly 10 passes. The heating body 122 prevents the electrode assembly 10 from being changed in temperature by an external temperature change. That is, the heating body 122 comprises an accommodation space 122a through which the electrode assembly 10 passes. The plurality of heating rollers 121 that press the electrode assembly 10 and simultaneously heat the electrode assembly 10 are accommodated in the accommodation space 122a.

Thus, the heating body 122 may press the electrode assembly 10 and simultaneously heat the electrode assembly 10 through the plurality of heating rollers 121 in the accommodation space 122a to effectively heat the electrode assembly 10. Particularly, the electrode assembly 10 may be prevented from being rapidly changed in temperature by external environments.

The heating body 122 further comprises an adjustment device 122b that allows the plurality of heating rollers 121 to descend or return to its original position toward the electrode assembly 10. The adjustment device 122b may allow the whole or any one or more of the plurality of heating rollers 121 to be in contact with or be separated from the electrode assembly 10. Thus, the number of heating rollers that press and heat the electrode assembly may be adjusted to effectively adjust the heating temperature of the electrode assembly 10.

The heating roller part 120 further comprises a temperature sensor 123 that measures a temperature of the electrode assembly 10 passing through the plurality of heating rollers 121 and a controller 124 that generates a normal signal when the measured temperature value is within a set error range in comparison to a previously input set temperature value and outputs an abnormal signal when the measured temperature value is out of the set error range.

That is, the heating roller part 120 measures a temperature of the electrode assembly 10 passing through the plurality of heating rollers 121 by using the temperature sensor 123 to calculate a measured temperature value and then transmit the temperature value to the controller 124. Thus, the controller 124 compares the measured temperature value transmitted from the temperature sensor 123 with a previously input set temperature value. Here, when the measured temperature value is within the set temperature value, the normal signal is generated, and when the measured temperature value is greater or less than the set temperature value, the abnormal signal is generated. Accordingly, whether the heated electrode assembly is defective may be effectively detected.

The temperature sensor 123 may be installed in each of the plurality of heating rollers 121 that sequentially heat the surface of the electrode assembly to confirm and inspect all the temperatures of the electrode assembly heated by the plurality of heating rollers 121, thereby easily confirming a heating section in which the defective electrode assembly occurs. In other embodiment, the temperature sensor 123 may be installed outside of the plurality of heating rollers 121, and adjacent the electrode assembly 10.

The heating roller part 120 may further comprise an adjustment member 125 that heats or cools the electrode assembly 10 passing through the plurality of heating rollers 121 to adjust the temperature of the electrode assembly 10 so that the temperature of the electrode assembly 10 is within an error range of the previously input set temperature value when the abnormal signal is output by the controller 124.

That is, the adjustment member 125 comprises an adjustment roller 125a that heats or cools the electrode assembly 10 so that the temperature of the electrode assembly is within the error range of the previously input set temperature and an adjustment piece 125b that adjusts a temperature of the adjustment roller 125a so that the adjustment roller 125a heats or cools the electrode assembly 10.

As described above, the adjustment member 125 may correct the temperature of the electrode assembly 10 that is inspected as defective so as to be within the set temperature value, thereby preventing the defective electrode assembly from being manufactured.

According to another embodiment, the temperature of the electrode assembly, which is inspected as defective, may be corrected to be within the set temperature value by adjusting a transfer speed of the electrode assembly. That is, when the abnormal signal is output, the controller 124 may accelerate or decelerate the transfer speed of the electrode assembly 10 through the transfer part 110. As a result, while the transfer speed of the electrode assembly 10 is adjusted, a contact time for which the electrode assembly 10 and the heating roller part 120 may be adjusted to adjust a heating temperature of the electrode assembly. That is to say, when the transfer speed of the electrode assembly decreases, the contact time between the electrode assembly 10 and the heating rollers may increase, and thus, the electrode assembly 10 may increase in temperature. On the other hand, when the transfer speed of the electrode assembly increases, the contact time between the electrode assembly and the heating rollers may decrease, and thus, the temperature of the electrode assembly may decrease.

In the heating roller part 120, each of the plurality of heating rollers 121 has a size less than that of the rolling roller 130 to minimize an unheating time of the electrode assembly 10 due to the plurality of heating rollers 121, thereby more quickly heating the electrode assembly 10. Particularly, a distance between each of the heating rollers 120 and the rolling roller may be minimized to minimize a transfer time that is taken to transfer the electrode assembly 10 from the heating roller to the rolling roller. Therefore, the electrode assembly 10 may be rolled in a state in which the temperature change of the electrode assembly 10 is minimized. Particularly, a distance between an outer circumferential surface of the heating roller, which is disposed at a rolling roller-side, and an outer circumferential surface of the rolling roller may be 2 mm to 10 mm. Thus, an interference between the heating roller and the rolling roller is prevented from occurring, and also, the electrode assembly may be rolled in the state in which the temperature change of the electrode assembly is minimized.

A blocking plate 126 for preventing heat from being transferred may be provided between the plurality of heating rollers 121. That is, the blocking plate 126 may prevent a heat source from being transferred from the heating rollers 121 corresponding to each other, i.e., from being transferred from one heating roller 121 to the other heating roller 121. Therefore, each of the heating rollers may be prevented from being changed in temperature, and thus, the electrode assembly may be more accurately heated to increase in temperature.

When the heating roller part 120 does not comprise the heating body 122, the blocking plate 126 for preventing heat from being transferred may be provided between the heating roller 121 and the rolling roller 130 to prevent the heat from being transferred between the heating roller 121 and the rolling roller 130, which correspond to each other. That is, the blocking plate 126 may prevent the heat source of the heating roller 121 from being transferred to the rolling roller 130 or prevent the heat source of the rolling roller 130 from being transferred to the heating roller 121. Thus, the heating roller or the rolling roller may press the electrode assembly in the state of being maintained at a predetermined temperature to more accurately heat the electrode assembly so that the electrode assembly increases in temperature.

Rolling Roller

The rolling roller 130 rolls the electrode assembly 10 that is heated by the heating roller part 120 to bond the electrode 11 and the separator 12, which are provided in the electrode assembly 10, to each other.

Thus, the lamination device 100 according to the first embodiment of the present invention may directly conduct the heat source to the electrode assembly 10 to heat the electrode assembly 10. Thus, the electrode assembly may be more quickly heated to improve heat transfer efficiency.

Hereinafter, a lamination method according to the first embodiment of the present invention will be described.

[Lamination Method According to First Embodiment of the Present Invention]

Figure 3:
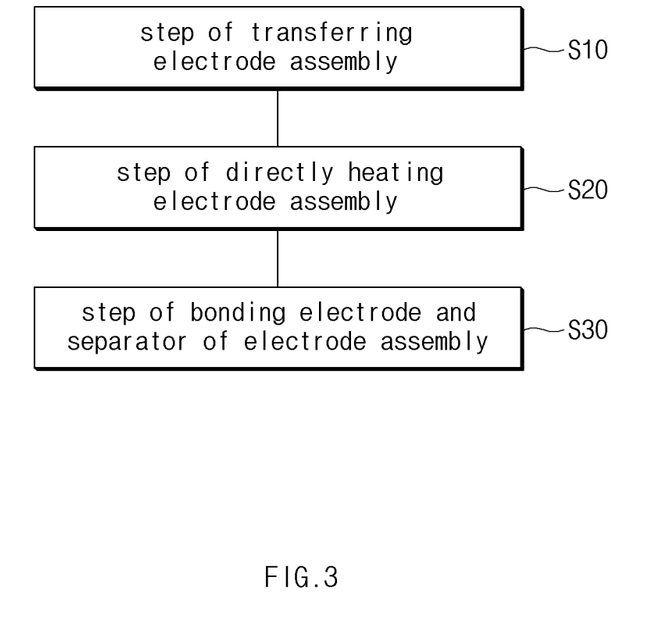
FIG. 3 is a flowchart of a lamination method according to a first embodiment of the present invention.

As illustrated in FIG. 3, a lamination method according to the first embodiment of the present invention comprises a transfer step (S10) of transferring an electrode assembly 10 in which an electrode and a separator are laminated, a heating step (S20) of directly pressing the electrode assembly 10 transferred in the transfer step (S10) and simultaneously heating the electrode assembly 10, and a bonding step (S30) of rolling the electrode assembly heated in the heating step (S20) to bond the electrode and the separator to each other.

In the transfer step (S10), the electrode assembly 10 is transferred to a rolling roller 130 by using a transfer roller.

The heating step (S20) comprises a heating process (S21), a measuring process (S22), an inspection process (S23), and an adjustment process (S24).

In the heating process (S21), a surface of the electrode assembly 10 transferred in the transfer step (S10) is sequentially directly pressed and simultaneously heated through a plurality of heating rollers 121 so that the electrode assembly 10 gradually increases in temperature. That is, as the plurality of heating rollers 121 sequentially heats the surface of the electrode assembly 10, a surface temperature of the electrode assembly 10 may gradually increase. As a result, the temperature of the electrode assembly 10 may quickly increase to improve heat transfer efficiency.

In the measuring process (S22), the temperature of the electrode assembly 10 heated in the heating process (S21) is measured to calculate a measured temperature value.

In the inspection process (S23), the measured temperature value of the electrode assembly 10, which is measured in the measuring process (S22), is compared with an input set temperature value, and then, when the measured temperature value is within an error range, a normal signal is generated, and when the measured temperature value is out of the error range, an abnormal signal is output.

The set temperature value may be 40° C. to 70° C., and the error range may be ±2 to 4° C.

In the adjustment process (S24), when the abnormal signal is output by the inspection process (S23), the electrode assembly 10 is heated or cooled by the adjustment member 125 so that the temperature of the electrode assembly is adjusted to be within the error range of the set temperature value. That is, the adjustment member 125 heats or cools an adjustment roller 125a through an adjustment piece 125b. Here, the adjustment piece 125b heats the adjustment roller 125a to have a temperature greater than that of the electrode assembly 10 when the measured temperature value is less than the set temperature value and cools the adjustment roller 125a to have a temperature less than that of the electrode assembly 10 when the measured temperature value is greater than the set temperature value. Here, the adjustment piece 125b heats or cools the adjustment roller 125a up to a previously input value according to a deviation between the measured temperature value and a set temperature value. When the temperature of the adjustment roller 125a is adjusted, the adjustment roller 125a heats or cools the electrode assembly 10 to adjust the temperature of the electrode assembly 10. Therefore, the temperature of the electrode assembly 10 is adjusted to be within the error range of the set temperature value.

In the rolling step (S30), the electrode assembly 10 heated in the heating step (S20) is rolled by the rolling roller 130 to bond the electrode 11 and the separator 12 to each other.

Hereinafter, in descriptions of another embodiment of the present invention, constituents having the same function as the above-mentioned embodiment have been given the same reference numeral in the drawings, and thus duplicated description will be omitted.

[Secondary Battery Manufacturing Equipment According to Second Embodiment of the Present Invention]

Figure 4:
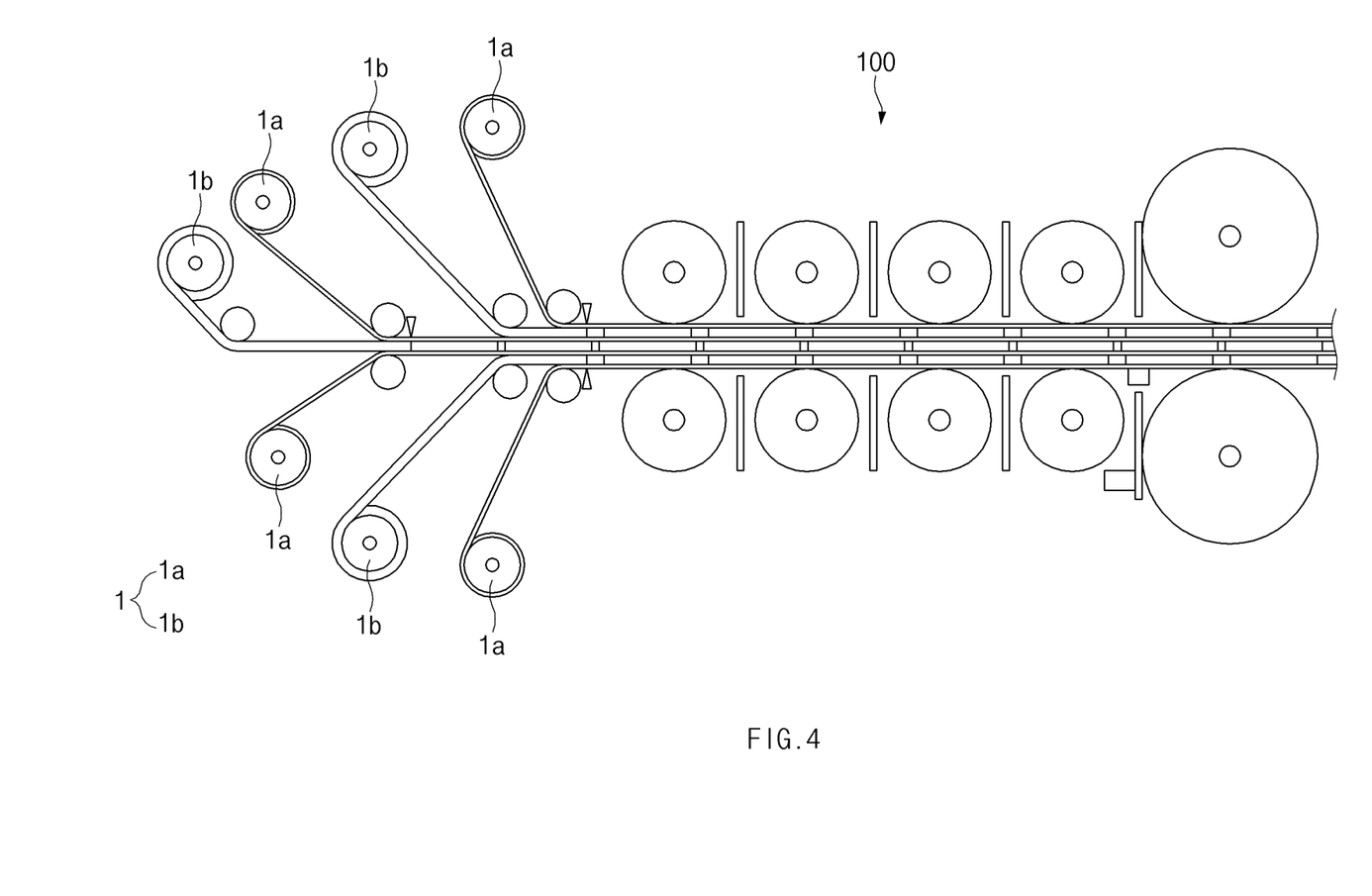
FIG. 4 is a side view of secondary battery manufacturing equipment according to a second embodiment of the present invention.

Secondary battery manufacturing equipment according to a second embodiment of the present invention comprises the lamination device according to the foregoing first embodiment as shown in FIG. 4.

That is, the secondary battery manufacturing equipment according to the second embodiment of the present invention comprises an electrode assembly manufacturing device 1 that manufactures an electrode assembly in which electrodes 1a and separators 1b are alternately laminated and a lamination device 100 through which the electrodes and the separators of the electrode assembly are bonded to each other. The lamination device comprises a transfer part that transfers the electrode assembly, a heating roller part that heats the electrode assembly transferred by the transfer part, and a rolling roller that rolls the electrode assembly heated by the heating roller part to bond the electrode to the separators.

Here, the lamination device 100 may have the same constituent and function as the lamination device according to the first embodiment, and thus, their duplicated description will be omitted.

Thus, the secondary battery manufacturing equipment according to the second embodiment of the present invention may produce a secondary battery having high quality.

[Lamination Device According to Third Embodiment of the Present Invention]

Figure 5:
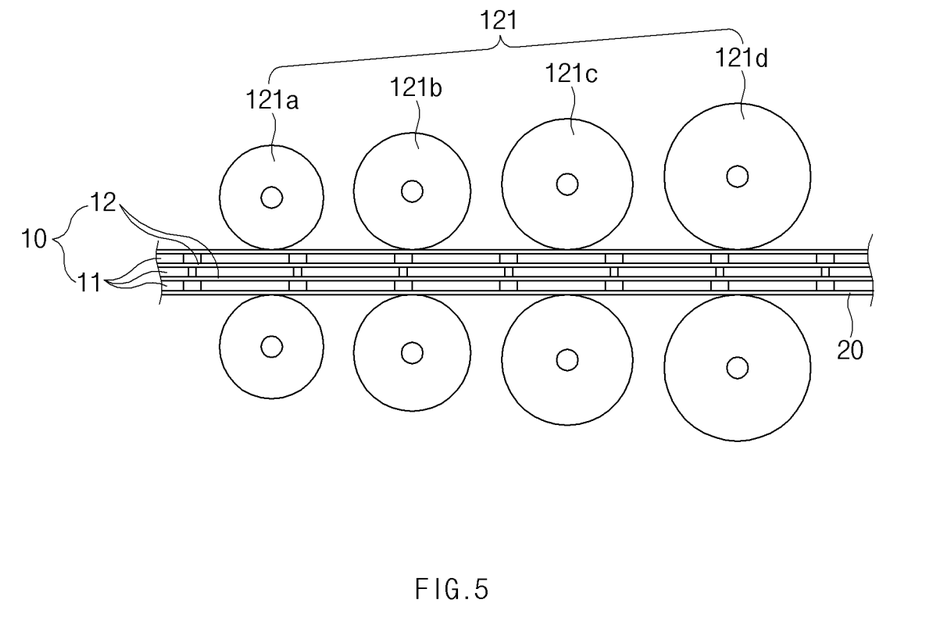
FIG. 5 is a side view of a lamination device according to a third embodiment of the present invention.

As illustrated in FIG. 5, a lamination device according to a third embodiment of the present invention comprises a heating roller part 120 comprising a plurality of heating rollers 121. Here, the plurality of heating rollers 121 have sizes different from each other.

For example, referring to FIG. 5, the plurality of heating rollers 121 have sizes that gradually increase from the heating roller initially heating the electrode assembly to the heating roller finally heating the electrode assembly. Accordingly, a contact area or pressing area between the heating roller and the electrode assembly may gradually increase, and thus, the temperature of the electrode assembly 10 may gradually increase, and the increase may be largely enlarged to increase in heating temperature of the electrode assembly.

Thus, the lamination device according to the third embodiment of the present invention may be provided with the plurality of heating rollers 121 having the different sizes to significantly increase in temperature of the electrode assembly.

[Lamination Device According to Fourth Embodiment of the Present Invention]

Figure 6:
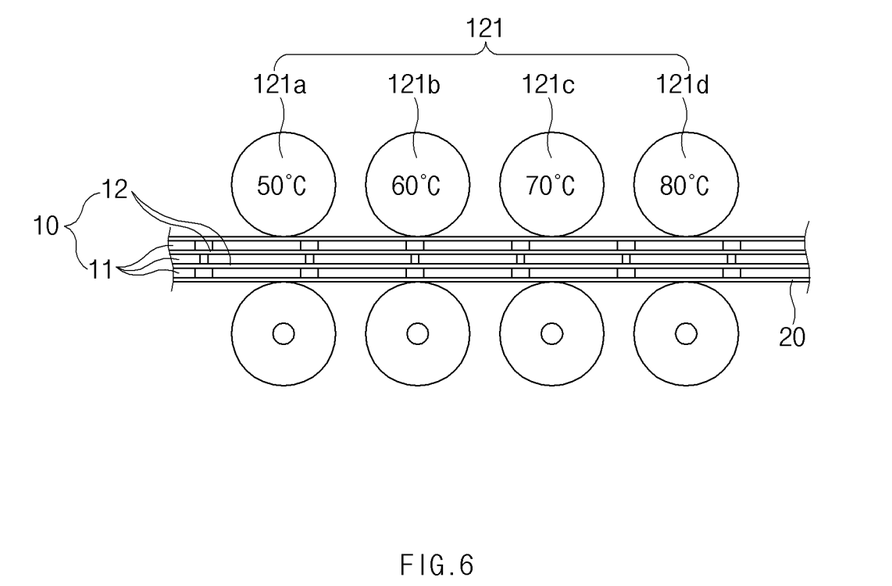
FIG. 6 is a side view of a lamination device according to a fourth embodiment of the present invention.

As illustrated in FIG. 6, a lamination device according to a fourth embodiment of the present invention comprises a heating roller part 120 comprising a plurality of heating rollers 121. Here, the plurality of heating rollers 121 have heating temperatures different from each other.

That is, in the lamination device according to the fourth embodiment of the present invention, when the plurality of heating rollers have heating temperatures different from each other, a heating temperature may gradually increase from a heating temperature at which the electrode assembly is initially heated to a heating temperature at which the electrode assembly is finally heated.

For example, a heating roller 121a that initially heats the electrode assembly is set to 50° C., the next heating roller 121b is set to 60° C., the one after the next heating roller 121c is set to 70° C., and the last heating roller 121d is set to 80° C. As described above, when the electrode assembly 10 is heated through the heating roller of which a temperature is set, a small temperature change of the electrode assembly 10 occurs at the initial stage, and a large temperature change of the electrode assembly 10 occurs at the last stage. Thus, the electrode assembly 10 may increase up to the set temperature.

Thus, in the lamination device according to the fourth embodiment of the present invention, the electrode assembly may significantly increase in heating temperature.

Experimental Example 1

Comparative Example

An electrode assembly is heated using a lamination device comprising a non-contact or non-pressurized heating device. That is, the non-contact or non-pressurized heating device uses a method in which heat is radiated to the electrode assembly.

Manufacturing Example 1

An electrode assembly is heated using a lamination device comprising a non-contact or directly pressurized heating device. That is, the electrode assembly is directly heated through the lamination device according to the first embodiment of the present invention. At this time, the lamination device according to the first embodiment of the present invention heats the electrode assembly by using four heating rollers.

Here, in Comparative Example 1 and Manufacturing Example 1, the same electrode assembly is used, and the same pressure, the same heating time, and the same temperature are applied. The same temperature is 110° C.

Heatability

Figure 7:
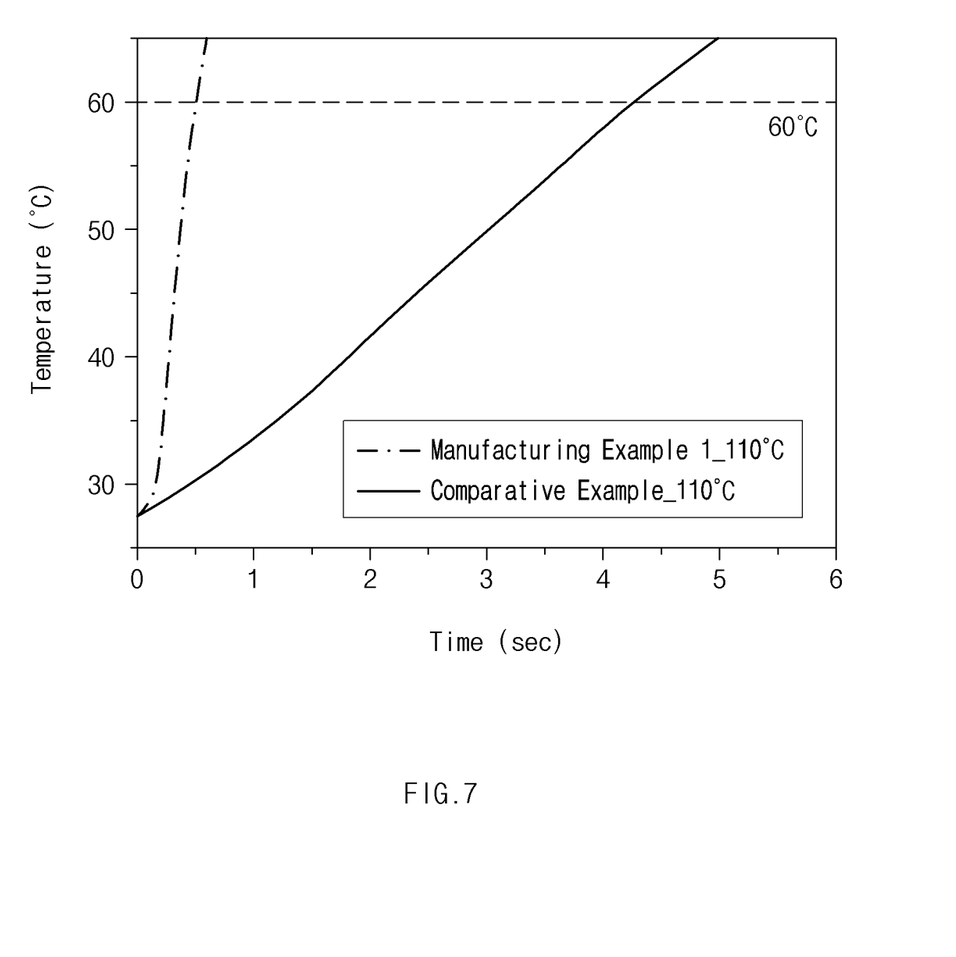
FIG. 7 is a graph illustrating Experimental Example 1 according to the present invention.

As the results of measuring the temperature of the electrode assembly heated through Comparative Example and Manufacturing Example 1, a graph of FIG. 7 may be obtained.

Referring to the graph of FIG. 7, when measuring a time for which the temperature of the electrode assembly heated through Comparative Example and Manufacturing Example 1 reaches 60° C., it takes 4.25 s for the temperature of the electrode assembly to reach 60° C. in Comparative Example, and it takes 0.44 s for the temperature of the electrode assembly to reach 60° C. in Manufacturing Example 1.

Figure 8:
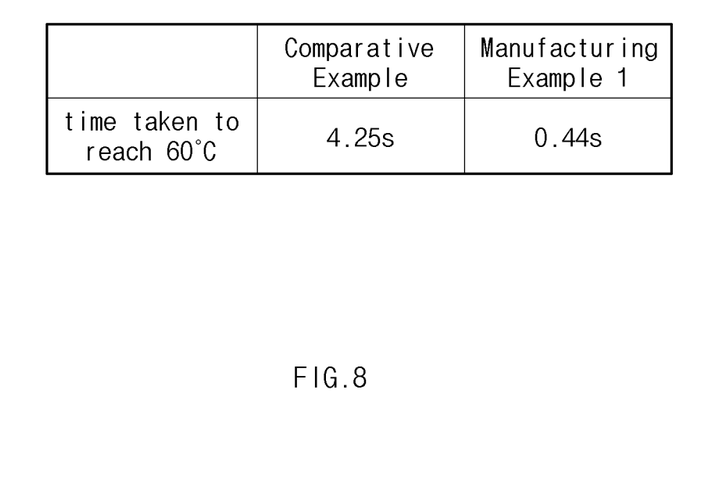
FIG. 8 is a table summarizing experimental results of Experimental Example 1 according to the present invention.

Therefore, as the results of comparing Manufacturing Example 1 with Comparative Example, the result table as shown in FIG. 8 may be obtained. Thus, it is seen that the temperature quickly increases in Manufacturing Example 1 in comparison to Comparative Example. Therefore, heat transfer efficiency may be significantly improved.

Experimental Example 2

In Manufacturing Example 2, a method in which an electrode assembly is directly heated by using a contact or directly pressurized heating device is performed. That is, the electrode assembly is directly heated through the lamination device according to the first embodiment of the present invention. At this time, the lamination device according to the first embodiment of the present invention heats the electrode assembly by using four heating rollers.

In particular, four heating rollers are set to 70° C., 90° C., and 100° C., and the experiment is performed three times.

Heatability

In Manufacturing Example 2, when the experiment is performed three times at temperature of 70° C., 90° C., and 100° C., as illustrated in FIG. 9, a graph in which the temperature of the electrode assembly gradually increase may be obtained.

That is, as illustrated in FIG. 9, when all the four heating rollers are set to 70° C., it is seen that a surface temperature of the electrode assembly gradually increases to temperatures of 36° C., 42° C., 46° C., and 49° C. When all the four heating rollers are set to 90° C., it is seen that a surface temperature of the electrode assembly gradually increases to temperatures of 39° C., 47° C., 53° C., and 57° C. When all the four heating rollers are set to 100° C., it is seen that a surface temperature of the electrode assembly gradually increases to temperatures of 43° C., 56° C., 65° C., and 69° C.

Therefore, as the results of the experiment as described above, the plurality of heating rollers may be used to gradually increase in temperature of the electrode assembly.

Experimental Example 3

In Manufacturing Examples 3 and 4, a method in which an electrode assembly is directly heated by using a contact or directly pressurized heating device is performed. That is, the electrode assembly is directly heated through the lamination device according to the first embodiment of the present invention.

Here, in Manufacturing Example 3, the electrode assembly transferred at a first speed is heated by using three heating rollers. In Manufacturing Example 4, the electrode assembly transferred at a second speed faster than the first speed is heated by using three heating rollers.

Here, all the three heating rollers described in Manufacturing Examples 3 and 4 are set to a temperature of 100° C.

Heatability

As the results of the experiment as described above, as illustrated in FIG. 10, in Manufacturing Example 3, it is seen that a surface temperature of the electrode assembly increases to temperature of 43° C., 56° C., and 65° C. In Manufacturing Example 4, it is seen that the surface temperature of the electrode assembly increases to temperature of 35° C., 43° C., and 52° C.

Figure 10:
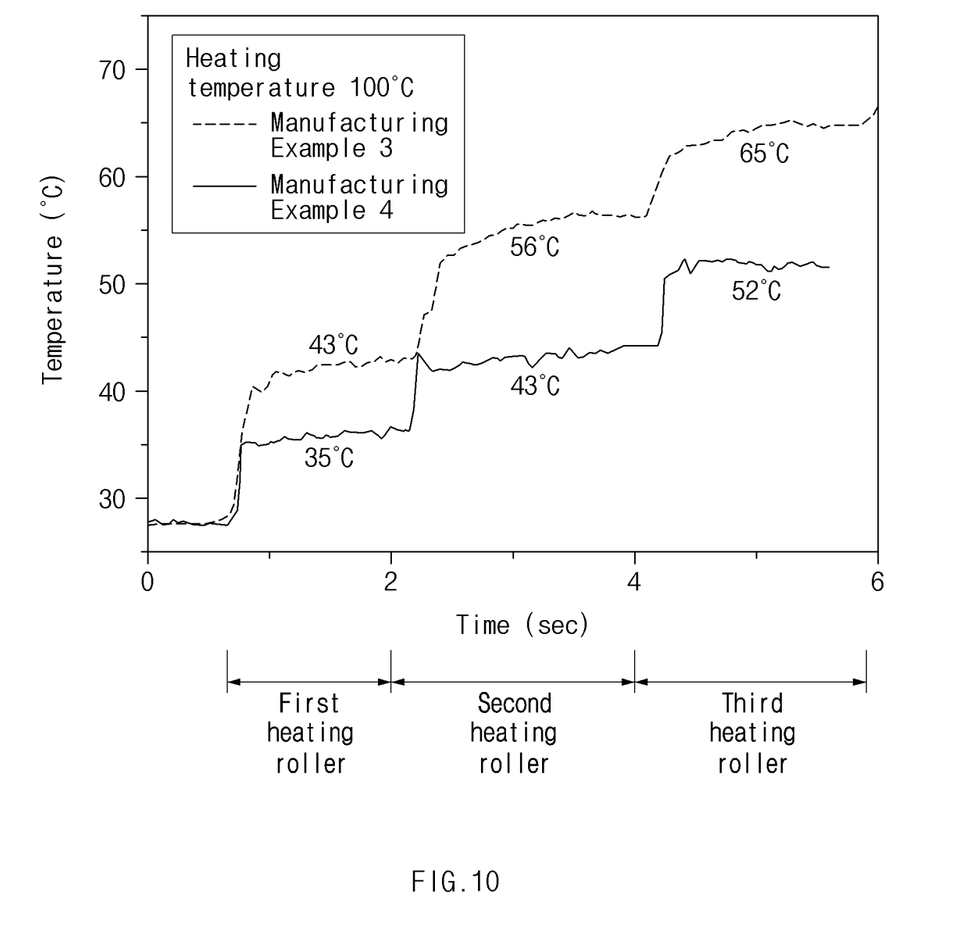
FIG. 10 is a graph illustrating Experimental Example 3 according to the present invention.

Therefore, referring to Manufacturing Examples 3 and 4, it may be seen that the surface temperature of the electrode assembly decreases as the transfer speed of the electrode assembly increases. Accordingly, when the transfer speed of the electrode assembly is adjusted, it may be seen that the heating temperature of the electrode assembly is adjusted.

Accordingly, the scope of the present invention is defined by the appended claims more than the foregoing description and the exemplary embodiments described therein. Various modifications made within the meaning of an equivalent of the claims of the invention and within the claims are to be regarded to be in the scope of the present invention.

The invention claimed is:

1. A lamination device for bonding an electrode and a separator of an electrode assembly to each other, the lamination device comprising:

a transfer part configured to transfer the electrode assembly;

a heating roller part configured to heat the electrode assembly transferred by the transfer part; and a rolling roller configured to roll the electrode assembly heated by the heating roller part so that the electrode and the separator are bonded to each other, wherein the heating roller part comprises a plurality of heating rollers configured to press and heat a surface of the electrode assembly at the same time, wherein the plurality of heating rollers sequentially press a same entire surface of the electrode assembly and simultaneously heat the same entire surface of the electrode assembly so that the electrode assembly gradually increases in temperature, wherein the plurality of heating rollers have the same heating temperature or different heating temperatures, wherein, when the plurality of heating rollers have the different heating temperatures, the heating temperature gradually increases from a heating roller that initially heats the electrode assembly to a heating roller that finally heats the electrode assembly, wherein a plurality of blocking plates are located between the plurality of heating rollers, respectively, without covering upper or lower portions of the plurality of heating rollers, and the plurality of blocking plates are configured to prevent heat from being transferred between the plurality of heating rollers that are adjacent to each other, wherein the lamination device further comprises an adjustment device configured to allow the plurality of heating rollers to move away from or return to an original position toward the electrode assembly, and wherein the adjustment device is further configured to cause one or more of the plurality of heating rollers to be in contact with or be separated from the electrode assembly.

2. The lamination device of claim 1, wherein the plurality of heating rollers have the same size or different sizes.

3. The lamination device of claim 2, wherein, when the plurality of heating rollers have the different sizes, the plurality of heating rollers have sizes that gradually increase from the heating roller that initially heats the electrode assembly to the heating roller that finally heats the electrode assembly.

4. The lamination device of claim 1, wherein the heating roller part comprises a heating body having an accommodation space through which the electrode assembly passes, and wherein the plurality of heating rollers are provided in the accommodation space of the heating body to press the electrode assembly passing through the accommodation space and simultaneously heat the electrode assembly.

5. The lamination device of claim 4, wherein the heating roller part further comprises:

a temperature sensor configured to measure a temperature of the electrode assembly passing through the plurality of heating rollers; and a controller configured to generate a first signal when a measured temperature value is within a set error range in comparison to a previously input set temperature value and output a second signal when the measured temperature value is outside of the set error range.

6. The lamination device of claim 5, wherein the heating roller part further comprises an adjustment member configured to heat or cool the electrode assembly passing through the plurality of heating rollers so as to adjust the temperature of the electrode assembly so that the temperature of the electrode assembly is within the error range of the previously input set temperature value when the second signal is output by the controller.

7. The lamination device of claim 5, wherein, when the second signal is output, the controller accelerates or decelerates a transfer speed of the electrode assembly through the transfer part to adjust a contact time between the electrode assembly and the heating roller part, thereby adjusting a heating temperature of the electrode assembly.

8. A secondary battery manufacturing equipment comprising:

an electrode assembly manufacturing device for manufacturing an electrode assembly by alternately laminating an electrode and a separator; and a lamination device for bonding the electrode and the separator of the electrode assembly to each other, wherein the lamination device comprises:

a transfer part configured to transfer the electrode assembly;

a heating roller part configured to heat the electrode assembly transferred by the transfer part; and a rolling roller configured to roll the electrode assembly heated by the heating roller part so that the electrode and the separator are bonded to each other, wherein the heating roller part comprises a plurality of heating rollers configured to press and heat a surface of the electrode assembly at the same time, wherein the plurality of heating rollers sequentially press a same entire surface of the electrode assembly and simultaneously heat the same entire surface of the electrode assembly so that the electrode assembly gradually increases in temperature, wherein the plurality of heating rollers have the same heating temperature or different heating temperatures, wherein, when the plurality of heating rollers have the different heating temperatures, the heating temperature gradually increases from a heating roller that initially heats the electrode assembly to a heating roller that finally heats the electrode assembly, wherein a plurality of blocking plates are located between the plurality of heating rollers, respectively, without covering upper or lower portions of the plurality of heating rollers, and the plurality of heating rollers are configured to prevent heat from being transferred between the plurality of heating rollers that are adjacent to each other, wherein the lamination device further comprises an adjustment device configured to allow the plurality of heating rollers to move away from or return to an original position toward the electrode assembly, and wherein the adjustment device is further configured to cause one or more of the plurality of heating rollers to be in contact with or be separated from the electrode assembly.

9. The secondary battery manufacturing equipment of claim 8, wherein the plurality of blocking plates includes a first set of the plurality of blocking plates configured to be located on a first side of the electrode assembly and a second set of the plurality of blocking plates configured to be located on a second side of the electrode assembly that is opposite to the first side, and wherein the first set of the plurality of blocking plates that are plate-shaped are parallel to the second set of the plurality of blocking plates that are plate-shaped.

10. The secondary battery manufacturing equipment of claim 9, wherein the first set of the plurality of blocking plates are individually aligned with the second set of the plurality of blocking plates, respectively.

11. The lamination device of claim 1, wherein the plurality of blocking plates includes a first set of the plurality of blocking plates configured to be located on a first side of the electrode assembly and a second set of the plurality of blocking plates configured to be located on a second side of the electrode assembly that is opposite to the first side, and wherein the first set of the plurality of blocking plates that are plate-shaped are parallel to the second set of the plurality of blocking plates that are plate-shaped.

12. The lamination device of claim 11, wherein the first set of the plurality of blocking plates are individually aligned with the second set of the plurality of blocking plates, respectively.

\* \* \* \* \*